US010129586B2

(12) United States Patent
Jeon et al.

(10) Patent No.: US 10,129,586 B2
(45) Date of Patent: Nov. 13, 2018

(54) DETECTING AND ISOLATING TELEVISION PROGRAM CONTENT FROM RECORDINGS OF TELEVISION AIRINGS

(71) Applicant: Google Inc., Mountain View, CA (US)

(72) Inventors: Joon-Hee Jeon, Palo Alto, CA (US); Jason R. Kimball, San Mateo, CA (US); Benjamin P. Stewart, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/383,958

(22) Filed: Dec. 19, 2016

(65) Prior Publication Data

US 2018/0176634 A1 Jun. 21, 2018

(51) Int. Cl.
*H04N 21/433* (2011.01)
*H04N 21/4147* (2011.01)
*H04N 21/432* (2011.01)
*H04N 21/647* (2011.01)
*H04N 21/472* (2011.01)
*H04N 21/234* (2011.01)
*H04N 21/41* (2011.01)
*H04N 21/233* (2011.01)
*H04N 21/2187* (2011.01)

(52) U.S. Cl.
CPC ..... *H04N 21/4334* (2013.01); *H04N 21/2187* (2013.01); *H04N 21/233* (2013.01); *H04N 21/23418* (2013.01); *H04N 21/4104* (2013.01); *H04N 21/4147* (2013.01); *H04N 21/432* (2013.01); *H04N 21/47202* (2013.01); *H04N 21/647* (2013.01)

(58) Field of Classification Search
None
See application file for complete search history.

(56) References Cited

U.S. PATENT DOCUMENTS

| | | | |
|---|---|---|---|
| 2003/0091323 A1* | 5/2003 | Abe | G11B 27/28 386/285 |
| 2003/0126598 A1* | 7/2003 | Agnihotri | G06F 17/30787 725/32 |
| 2005/0002644 A1* | 1/2005 | Nakamura | G11B 27/105 386/250 |
| 2005/0240967 A1* | 10/2005 | Anderson | H04N 5/50 725/52 |

(Continued)

*Primary Examiner* — Michael R Telan
(74) *Attorney, Agent, or Firm* — Colby Nipper

(57) ABSTRACT

Various implementations process a television content stream to detect program boundaries such as the starting point and ending point of the program. In at least some implementations, program boundaries such as intermediate points between the starting point and ending point of the program are also detected. The intermediate points correspond to where a program pauses for secondary content such as an advertisement or advertisements, and then resumes once the secondary content has run. Once program boundaries are detected, primary content is isolated by removing secondary content that occurs before the starting point and after the ending point. In at least some implementations, secondary content that occurs between detected intermediate points is also removed. The primary content is then recorded without secondary content that originally comprised part of the original television content stream.

20 Claims, 5 Drawing Sheets

(56) References Cited

U.S. PATENT DOCUMENTS

| | | | | |
|---|---|---|---|---|
| 2007/0250856 A1* | 10/2007 | Leavens | ............... | H04H 60/48 |
| | | | | 725/36 |
| 2010/0305729 A1* | 12/2010 | Glitsch | ............ | G06F 17/30026 |
| | | | | 700/94 |
| 2013/0144725 A1* | 6/2013 | Li | ................... | H04N 21/23424 |
| | | | | 705/14.66 |

* cited by examiner

//DETECTING AND ISOLATING TELEVISION PROGRAM CONTENT FROM RECORDINGS OF TELEVISION AIRINGS

BACKGROUND

Digital video recording is a common technique to enable users to record live television programs so that the users can later watch recorded programs on their own time. One existing problem, however, is that electronic program guides do not provide a true exact start and end time of the program. For example, the electronic program guide may indicate that a program is to air from 8:00 p.m. to 9:00 p.m. Pacific Standard Time. In actuality, the start time of the program itself may be anytime between 7:59:30 p.m. to 8:05 p.m. Thus, the recording itself will not include just the content of the program, termed "primary content", but rather will include other "secondary content" that is different from the primary content, such as content from other programs and advertisements before, during, and after the program. This can be annoying to a user who wishes to view only the television program and not the advertisements.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Various implementations process a television content stream to detect program boundaries associated with primary content, such as the starting point and ending point of the program. In at least some implementations, program boundaries such as intermediate points between the starting point and ending point of the program are also detected. The intermediate points correspond to where a program pauses for secondary content, such as an advertisement or advertisements, and then resumes once the secondary content has run. Once program boundaries are detected, program content is isolated by removing secondary content such as advertisements—hereinafter, "ads", as well as other secondary content—that occur before the starting point and after the ending point. In at least some implementations, secondary content such as ads that occur between detected intermediate points are also removed. The program content is then recorded without secondary content that originally comprised part of the original television content stream.

In at least some implementations, a program content isolator module receives a television content stream that includes various secondary content such as ads, and analyzes the television content stream to identify various characteristics of the television content stream. Once the characteristics of the television content stream are identified, semantics that are associated with ads and/or program content can be applied to the television content stream to identify the program boundaries. Semantics can reside in the form of a rule set having multiple rules that can be applied to the television content stream.

Once the program boundaries are identified, the primary content, i.e., program content, can be isolated by removing secondary content such as ads, outside of the program boundaries. The primary content is then recorded without the secondary content that originally comprised part of the original television content stream.

The program content isolator module can reside as a module that is provided as part of a network-based service, also termed a "cloud service". Alternately or additionally, aspects of the program content isolator module can reside on an end user computing device, such as a smart television having a digital video recorder (DVR).

BRIEF DESCRIPTION OF THE DRAWINGS

The detailed description is described with reference to the accompanying figures.

DETAILED DESCRIPTION

Overview

Figure 1:
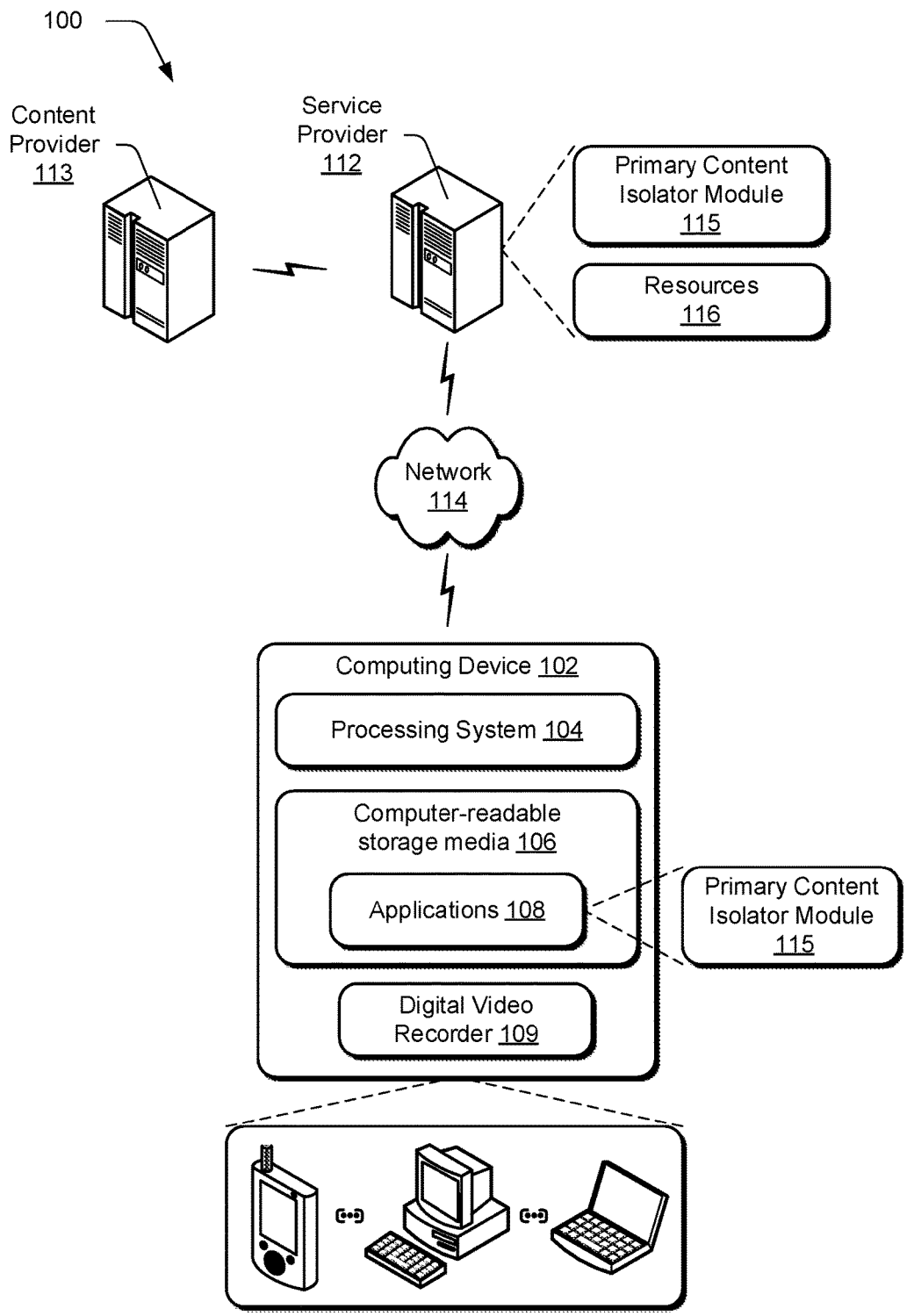
FIG. 1 is an illustration of an environment in an example implementation that is operable to employ techniques described herein.

Various implementations process a television content stream to detect program boundaries associated with primary content, such as the starting point and ending point of the program. In at least some implementations, program boundaries such as intermediate points between the starting point and ending point of the program are also detected. The intermediate points correspond to where a program pauses for secondary content, such as an advertisement or advertisements and then resumes once the secondary content has run. Once program boundaries are detected, program content is isolated by removing secondary content such as advertisements—hereinafter, "ads", as well as other secondary content—that occur before the starting point and after the ending point. In at least some implementations, ads that occur between detected intermediate points are also removed. The program content is then recorded without secondary content that originally comprised part of the original television content stream. In this way, the recorded primary content that the user consumes starts at the actual start time of the program and ends at the actual end time of the program. A program can have a scheduled start time and a scheduled end time. The "actual start time" of the program refers to the time that the program actually begins. So, for example, if a program is indicated in the electronic program guide to have a scheduled start time at 5 p.m., but secondary content that appears before the program causes the program to actually begin at 5:03 p.m., the "actual start time" of the program would be 5:03 p.m. The same can be said for the actual end time of the program. That is, the "actual end time" of a program refers to the time that the program actually ends, which may be different from the scheduled end time. In various implementations, the described approaches can also be used to detect secondary content in the form of adjacent programs and/or advertisement so that content in which a user is not interested can be removed from the starting point, one or more intermediate points, or the ending point of a television content stream that includes primary content (e.g., a program) in which the user is interested.

In some implementations, at least some secondary content, such as ads that are removed, such as those associated with the detected intermediate points, may be replaced by secondary content, e.g., different ads, which may or may not have the same duration as the removed secondary content. In some instances, secondary content replacement provides an opportunity to more directly position secondary content, such as ads, towards individual users.

In at least some implementations, a program content isolator module receives a television content stream that includes various secondary content such as ads, and analyzes the television content stream to identify various characteristics of the television content stream. Once the characteristics of the television content stream are identified, semantics that are associated with ads and/or program content can be applied to the television content stream to identify the program boundaries. Semantics can reside in the form of a rule set having multiple rules that can be applied to the television content stream. In some implementations, the rule set has multiple different rule types that can be used in different combinations to more precisely identify the program boundaries. For example, audio rules can be used to identify program boundaries associated with audio characteristics of the television content stream. Video rules can similarly be used to identify program boundaries associated with video characteristics of the television content stream. The program boundaries identified by both the audio rules and the video rules can then be compared to ensure that program boundaries are identified with more accuracy.

Once the program boundaries are identified, the primary content, i.e. program content, can be isolated by removing secondary content such as ads, outside of the program boundaries. The program content may then be recorded or caused to be recorded without the secondary content that originally comprised part of the original television content stream.

The program content isolator module can reside as a module that is provided as part of a network-based service, also termed a "cloud service". Alternately or additionally, aspects of the program content isolator module can reside on an end user computing device, such as a smart television, tablet, and the like, having a digital video recorder (DVR).

In the following discussion, an example environment is first described that can employ the techniques described herein. Example implementation details and procedures are then described which can be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 including a processing system 104 that includes one or more processing devices, one or more computer-readable storage media 106, and various applications 108 embodied on the computer-readable storage media 106 and operable via the processing system 104 to implement corresponding functionality described herein.

In at least some implementations, applications 108 can optionally include or otherwise make use of a primary content isolator module 115. In some implementations, the primary content isolator module 115 is a standalone application. In other implementations, the primary content isolator module 115 is included as part of another application or system software such as a computing device's operating system. In other implementations, the primary content isolator module 115 is provided as a network service by a service provider 112 as described in more detail below.

The primary content isolator module 115 is configured to process a television content stream to detect program boundaries such as the starting point and ending point of the program. In at least some implementations, program boundaries such as intermediate points between the starting point and ending point of the program are also detected. The intermediate points correspond to where a program pauses for secondary content such as an ad or ads, and then resumes once the secondary content has run. Once program boundaries are detected, primary content, i.e., program content, is automatically isolated by removing secondary content such as ads that occur before the starting point and after the ending point. The primary content is then recorded without secondary content such as one or more ads that originally comprised part of the original television content stream. In this way, the recorded program content that the user consumes starts at the actual start time of the program and ends at the actual end time of the program.

In at least some implementations, secondary content, such as ads, that occur between detected intermediate points is also removed. In some instances, the removed secondary content is replaced with other different secondary content. For example, ads that are removed between detected intermediate points may be replaced with ads that are more specifically targeted to the end user, as discussed below in more detail.

This constitutes an improvement over current approaches which use a primarily manual approach to remove ads. The automated nature of the described implementations provides a fast, efficient and easily scalable solution, as discussed below in more detail.

Applications 108 may also include a web browser which is operable to access various kinds of web-based resources (e.g., content and services). In at least some implementations, the applications include one or more video players. In at least some implementations, the applications 108 represent a client-side component having integrated functionality operable to access web-based resources (e.g., a network-enabled application), browse the Internet, interact with online providers, and so forth. Applications 108 further include an operating system for the computing device 102 and other device applications.

The computing device 102 can also include a digital video recorder (DVR) 109 that enables an end user to record television programs. The DVR 109 can include a digital video recorder (DVR) program, a viewing statistics program, and view data. The DVR program encodes video content that is received into a digital format, such as MPEG-2, and stores the video content on a data storage device, such as a hard drive, for later playback. The DVR program also provides the user an ability to pause the video content during a live television program, rewind the video content during a live television program, and record video content associated with a television program for later viewing. The viewing statistics program is a program that collects, computes, stores, and reports view data during the playback of video content. The view data may include the number of times the user watches an advertisement, advertisements skipped, and the like. If the user requests, via the DVR program, to stop the video content during playback of an advertisement, the view data may also include the portion or percentage of the advertisement that the user viewed before stopping the video content. If the user requests, via the DVR program, to switch from normal play mode to a trick play mode during the playback of the advertisement, the view data may also include which trick play operation the viewer selected and at which position in the video content the user selected the trick play operation. For example, selecting slow motion or rewind during the advertisement implies that the viewer is interested in the advertisement, while selecting fast forward implies that the viewer is disinterested in the advertisement.

The computing device 102 may be configured as any suitable type of computing device. For example, the computing device may be configured as a television entertainment system, desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., television entertainment system, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud".

The environment 100 further depicts a service provider 112, configured to communicate with computing device 102 over a network 114, such as the Internet, to provide a "cloud-based" computing environment. The network can be any suitable network such as, by way of example and not limitation, a public communication network or wide area network (WAN). Various comparable network architectures can be employed. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA), Code Division Multiple Access (CDMA), or Orthogonal Frequency Division Multiplexing (OFDM) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

The service provider 112 includes a primary content isolator module 115 that operates as described above and below. Generally speaking, service provider 112 is configured to make various resources 116 available over the network 114 to clients. In the illustrated and described implementation, resources 116 can include program content that has been processed by primary content isolator module 115. In some scenarios, users may sign up for accounts that are employed to access corresponding resources, such as streaming video, from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a notification service (such as one that sends various types of notifications to applications 108), a content publisher service that distributes content, such as streaming videos and the like, to various computing devices, an advertising server service that provides advertisements to be used in connection with distributed content, a web development and management service, a collaboration service, a social networking service, a messaging service, and so forth. Content may include various combinations of assets, video comprising part of an asset, advertisements, audio, multi-media streams, animations, images, television program content such as television content streams, web documents, web pages, applications, device applications, and the like.

Environment 100 also includes a content provider 113 that typically provides content to service provider 112 that can be processed by service provider 112 and subsequently distributed to and consumed by end-users of computing devices, such as computing device 102. Content provided by the content provider 113 can include one or more ads that are processed and removed by the service provider 112 by way of program content isolator module 115.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface.

Having considered an example operating environment, consider now an example primary content isolator module in accordance with one or more implementations.

Example Primary Content Isolator Module

Figure 2:
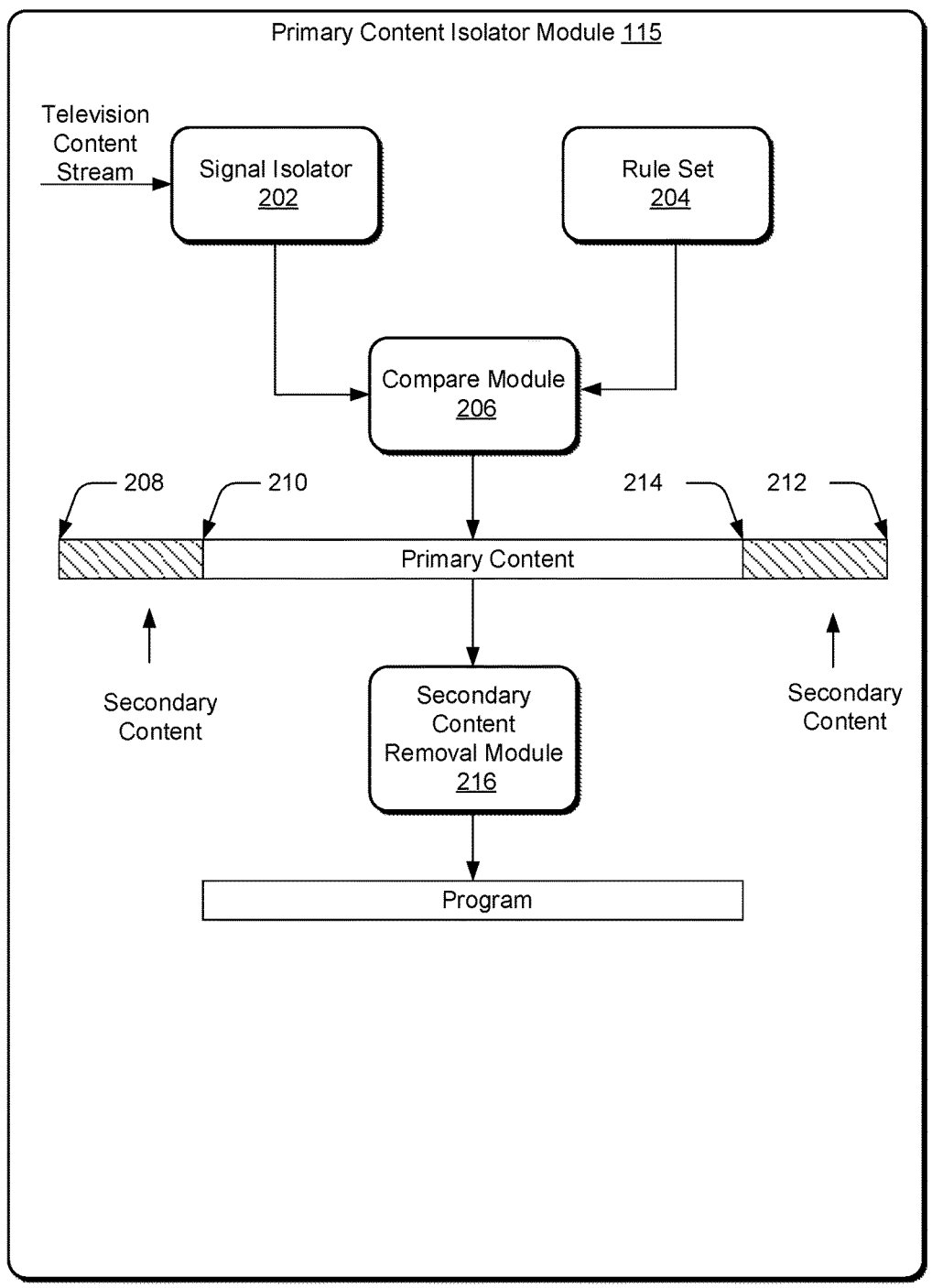
FIG. 2 is an illustration of an example program content isolator module in accordance with one or more implementations.

FIG. 2 illustrates an example primary content isolator module 115 in accordance with one or more implementations. The primary content isolator module 115 includes a signal isolator 202, a rule set module 204, a compare module 206, and a secondary content removal module 216.

Signal isolator 202 is representative of functionality, and constitutes but one means that receives a television content stream that includes various secondary content such as ads, and analyzes the television content stream to identify various characteristics of the television content stream. The characteristics of the television content stream can comprise any suitable type of characteristics that enable primary content to be isolated. For example, the characteristics can include audio characteristics, video characteristics, audio and video characteristics, video stream characteristics, comparison characteristics, and the like.

Rule set module 204 is representative of functionality, and constitutes but one means that includes various semantics that are associated with secondary content such as ads and/or primary content. The semantics represent an understanding and familiarity with television content streams in general, the structure of such television content streams, and how secondary content such as ads, and primary content are typically represented in the television content streams. Thus, rule set module 204 includes multiple different rule types which can be used by themselves, or combined to provide a very robust, accurate and reliable system. The multiple different rule types include, by way of example and not limitation, rules that pertain to audio characteristics, video characteristics, audio and video characteristics, video stream characteristics, comparison characteristics, and the like, that can be used to identify primary content within the television content stream.

Compare module 206 is representative of functionality, and constitutes but one means that applies the semantics from rule set module 204 to the characteristics of the television content stream identified by signal isolator 202, to identify boundaries, such as program boundaries within the television content stream. For example, an excerpt of an example television content stream is shown just below compare module 206. The television content stream includes two portions of secondary content such as ads, illustrated as cross-hatched stream portions, and primary content designated "Primary Content". In this example, the compare module 206 has applied the semantics from rule set module 204 to the characteristics of the television content stream received by signal isolator 202 and identified four boundaries 208, 210, 212, and 214.

The secondary content removal module 216 is representative of functionality, and constitutes but one means that isolates primary content from the television content stream. That is, once the boundaries, such as program boundaries 210, 214 are identified, the primary content can be isolated by removing secondary content, such as ads, outside of the program boundaries. In this example, the secondary content would be represented by the content between boundaries 208 and 210, and boundaries 212 and 214. The primary content can now be recorded by an end-user's computing device without secondary content that originally comprised part of the original television content stream. The secondary content can be removed using any suitable techniques. For example, in some instances the boundaries can be treated as splice points such that secondary content occurring between different splice points can be removed, as by being filtered by any suitable filtering technology. For example, digital frames associated with the secondary content can be identified and removed by editing the television content stream to remove the corresponding digital frames of secondary content. In this way, the user's recorded program content starts at the actual start time and ends at the actual end time.

Accordingly, in implementations where the primary content isolator module 115 resides as a module that is provided as a network-based service, the primary content can be recorded by transmitting the primary content to an end-user's computing device so that the computing device's digital video recorder (DVR) can record the content. For example, a user may indicate, through their smart television device, that they wish to record a live program, such as a sporting event, to their DVR. The smart television device's electronic program guide (EPG) indicates that the program starts at 9 p.m. and ends at 11 p.m. The user's smart television device generates a notification of the user's intent to record the program and transmits the notification to the network-based service. When the program airs, the primary content isolator module 115 can process the program, as described above, to remove the secondary content such as ads, and thereby isolate the program from the television content stream. The program can then be transmitted to the user's smart television device so that the program can be recorded on the DVR without any ads. Transmission of the program can occur at any suitable time during or after broadcast of the live program. For example, in some instances, the live program can be processed by the primary content isolator module 115 for a "buffer" time. The buffer time can be set such that processed television content of the program can be streamed while other television content of the program is currently being processed. The buffer time can be selected such that streaming can occur in an uninterrupted fashion without "catching up" to the television content currently being processed by the primary content isolator module 115. For example, a buffer time of 10 or 15 minutes might be selected to enable processed content to be streamed in an uninterrupted fashion while the television content stream is being processed by the primary content isolator module 115. Alternately or additionally, a live program may be entirely processed by the primary content isolator module to remove the ads and isolate the content before transmission to the user's smart television device. In instances where the primary content is not a live program, the primary content may be preprocessed to remove ads.

Alternately or additionally, in implementations where the primary content isolator module 115 resides on an end-user's computing device, the primary content can be recorded by the DVR after the secondary content has been removed.

Having considered an example primary content isolator module, consider now characteristics of a television content stream and how those characteristics can be used by the compare module 206 to identify primary content to enable the primary content to be isolated.

Example Characteristics of a Television Content Stream

Figure 3:
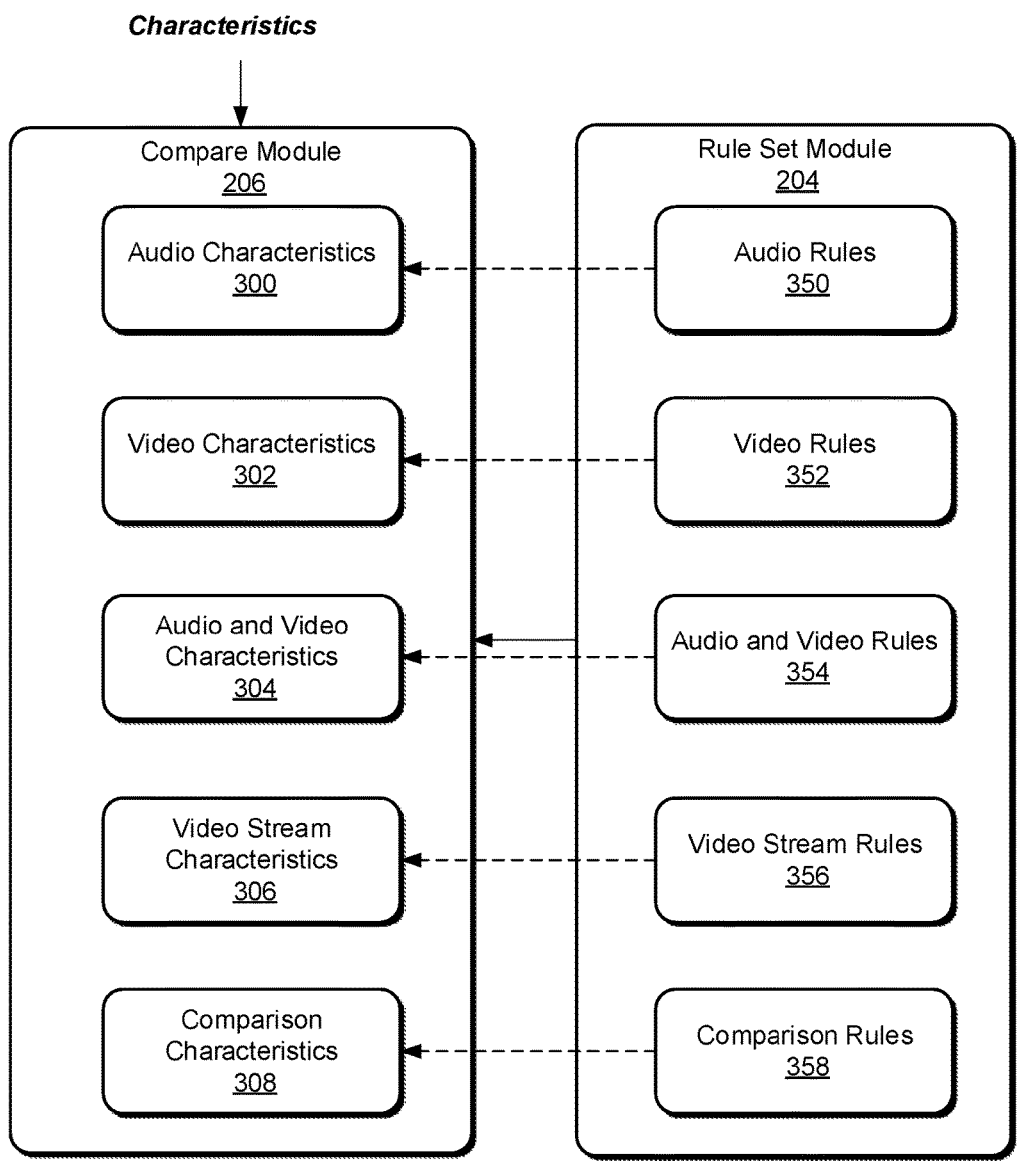
FIG. 3 is an illustration of an example compare module and an example rule set in accordance with one or more implementations.

FIG. 3 illustrates the compare module 206 and the rule set module 204 in accordance with one implementation. The compare module 206 receives information or data associated with characteristics of a television content stream from signal isolator 202 (FIG. 2). Semantics from rule set module 204 are then applied to identify boundaries, as described above.

In this particular example, the characteristics include, by way of example and not limitation, audio characteristics 300, video characteristics 302, audio and video characteristics 304, video stream characteristics 306, and comparison characteristics 308.

Rule set module 204 includes rules for the different characteristics that are received by compare module 206. Specifically, rule set module 204 includes multiple different rule types including audio rules 350, video rules 352, audio and video rules 354, video stream rules 356, and comparison rules 358. Use of the rule set constitutes an improvement over current approaches which use a primarily manual approach to remove ads. The automated nature of the described implementations provides a fast, efficient and easily scalable solution. That is, through the use of automated rules of the particular types discussed herein, television content can be more quickly and efficiently provided to end users in a desirable format. Moreover, the automated rules promote scalability by removing the need for human intervention, such as adding additional humans to perform an arduous manual process.

Consider now each of the characteristics and how rules from rule set module 204 can be applied to identify the boundaries for isolating primary content.

Audio Characteristics—300

Typically, secondary content, such as ads that appear in a television content stream, has different audio characteristics than the primary content included in the television content stream. For example, audio normalization can be used to attempt to identify secondary content that appears within a television content stream. Specifically, secondary content such as ads are typically compressed so as to provide a very limited set of amplitudes in the corresponding audio data. The amplitudes of the audio data within the television content stream can be analyzed and compared to identify variances that suggest the presence of secondary content, such as an ad, within the television content stream. In addition, the length of any amplitude variances can be detected to identify ads. For example, secondary content such as ads, typically have a predetermined duration such as 30 seconds. If an amplitude variance within the television content stream is identified to be roughly 30 seconds, a conclusion can be made that this amplitude variance exhibits characteristics of secondary content such as an ad.

Alternately or additionally, the type of audio data within the television content stream can be considered and analyzed. Specifically, audio data may be encoded at different resolutions so as to enable identification of secondary content within the television content stream. Specifically, primary content may be encoded at a higher resolution than audio data of secondary content. Thus, identifying variations in audio resolution can assist in identifying secondary content within the television content stream. In addition, the length of any variances in audio resolution can be detected to identify secondary content. For example, secondary content such as ads, typically have a predetermined duration such as 30 seconds. If an audio resolution variance within the television content stream is identified to be roughly 30 seconds, a conclusion can be made that this audio resolution variance exhibits characteristics of secondary content.

Alternately or additionally, often times between secondary content and primary content within a television content stream, a gap in the audio will appear, or a significant audio level drop will occur. The television content stream can be analyzed to identify any such gaps including the length of any such gaps. For example, a gap between secondary content and primary content may be 0.5 seconds. If two such gaps appear 30 seconds apart, a conclusion can be made that this gap presence and corresponding gap length is characteristic of secondary content.

In order to come to these conclusions, audio rules 350 are applied to the audio characteristics 300 by the compare module 206. So, in a very simplistic representation, example audio rules may specify:

If amplitude_variance=~30 seconds,
Then content=ad;
If distance_between_gap2_gap1=~30 seconds,
Then content=ad.

In some implementations, the rules can be crafted in a manner that assigns likelihoods to whether content is or is not secondary content. For example, if an amplitude variance is exactly 30 seconds, then a very high likelihood can be assigned that the corresponding content is indeed secondary content. If, on the other hand, the amplitude variance is 21 seconds, then a lower likelihood can be assigned that the corresponding content is secondary content. Likelihoods can be utilized by each of the rules within rule set module 204 to employ a threshold-based approach which is designed to provide a confidence measure of whether or not content is or is not secondary content.

Video Characteristics—302

Typically, secondary content appear in a television content stream will be preceded and succeeded by a black screen or a blank interval. The black screen or blank interval may have a predetermined or predictable length. The television content stream can be analyzed to identify any occurrences of black screen or blank intervals in the video, and the corresponding length of the black screen or blank intervals. If two black screen occurrences are identified with a corresponding length of 30 seconds between the black screen occurrences, a conclusion can be made that these black screen occurrences are the boundaries of secondary content.

Alternately or additionally, the type of video data within the television content stream can be considered and analyzed. Specifically, video data may be encoded at different resolutions so as to enable identification of secondary content within the television content stream. Specifically, primary content may be encoded at a higher resolution than video data of secondary content. Thus, identifying variations in video resolution can assist in identifying secondary content within the television content stream. In addition, the length of any variances in video resolution can be detected to identify secondary content. For example, secondary content typically has a predetermined duration such as, for example, 30 seconds. If a video resolution variance within the television content stream is identified to be roughly 30 seconds, a conclusion can be made that this video resolution variance exhibits characteristics of secondary content.

In order to come to these conclusions, video rules 352 are applied to the video characteristics 302 by the compare module 206. So, in a very simplistic representation, example video rules may specify:

If interval_between_blackscreens=~30 seconds,
Then content=ad;
If distance_between_video_resolution_variance=~30 seconds,
Then content=ad.

As mentioned above, the rules can be crafted in a manner that assigns likelihoods to whether content is or is not secondary content. For example, if the interval_between_blackscreens is exactly 30 seconds, then a very high likelihood can be assigned that the corresponding content is indeed secondary content. If, on the other hand, the interval_between_blackscreens is 28.9 seconds, then a lower likelihood can be assigned that the corresponding content is secondary content. This enables a threshold-based approach to be employed which is designed to provide a confidence measure of whether or not content is or is not secondary content.

Audio and Video Characteristics—304

In some implementations, both the audio and video characteristics of a television content stream can be analyzed by the compare module 206 to identify secondary content and primary content. For example, a fingerprint can be made of an individual program that includes secondary content from a first locale, such as Los Angeles. An example fingerprint is a hash that is computed from the television content stream. In this instance, the hash would include both the primary content and the secondary content within the program. The same program from a different locale, such as Chicago, can be hashed to include a hash of both the primary content and the secondary content within the program. Presumably, both programs would include different local secondary content such that the portions of the fingerprints that include the different local secondary content would not match up. The portions of both programs that include the primary content and common network ads would, however, match up. By virtue of identifying non-matching portions of the television content stream, various secondary content can be identified. Thus, when the compare module 206 encounters different non-matching portions of the television content stream, a conclusion can be made that the non-matching portions comprise secondary content.

An example of a system to use for computing fingerprints of television content streams is a system that creates an ID file for copyrighted audio and video material and stores the ID file in a database. When a video is uploaded, the video is checked against the database and the video is flagged as a copyright violation if a match is found. The same technology can be utilized to identify secondary content within a television content stream by looking for portions of the content stream whose fingerprints do not match.

In addition to looking for portions of the television content streams whose fingerprints do not match, the duration of non-matching fingerprint portions can also be analyzed. For example, if a non-matching fingerprint portion is found as between the same program, but the non-matching fingerprint portion is only 5 seconds long, then it may likely not constitute secondary content. If, on the other hand, the non-matching fingerprint portion as between the same program is exactly 30 seconds long, then a conclusion can be made that these program portions likely constitute secondary content.

In order to come to these conclusions, audio and video rules 354 are applied to the audio and video characteristics 304 by the compare module 206. So, in a very simplistic representation, example audio and video rules may specify:

If non_matching_fingerprint_portions=~30 seconds,
Then content=ad;
If non_matching_fingerprint_portions<~7 seconds,
Then content=not_ad.

As mentioned above, the rules can be crafted in a manner that assigns likelihoods to whether content is or is not secondary content. For example, if the non_matching_fingerprint_portions are exactly 30 seconds, then a very high likelihood can be assigned that the corresponding content is indeed secondary content. If, on the other hand, the non_matching_fingerprint_portions are 7 seconds, then a lower likelihood can be assigned that the corresponding content is secondary content. This enables a threshold-based approach to be employed which is designed to provide a confidence measure of whether or not content is or is not secondary content.

Video Stream Characteristics—306

In some implementations, video stream characteristics of the television content stream can be analyzed to determine the presence of secondary content. Specifically, in some instances, the television content stream can include metadata, typically in the form of some type of tag, that identifies where secondary content occurs in the television content stream. These tags indicate the secondary content boundaries and program boundaries. One example technology that provides information on ad location is SCTE-35 which is used in the United States to signal a local ad insertion opportunity in a transport stream. By identifying such metadata, the compare module can identify at least some of the secondary content that occurs in a television content stream.

In some instances, however, a television content stream will not include metadata for the secondary content therewithin. Rather, metadata may only be provided for a subset of secondary content within the particular television content stream. For example, a network may have, for every hour of a program, two minutes' worth of ads that are given to the end provider for local ad insertion. The network may have another 15 minutes of ads at the network level. However, the television content stream may only include metadata that identifies the local ads. In this instance, at least some of the ads can be identified for purpose of removal.

In this instance, the video stream rules 356 specify the metadata or metadata types that identify ad boundaries or content boundaries. When these rules are applied to the video stream characteristics 306 by the compare module 206, various ads can be identified.

Comparison Characteristics—308

In some implementations, comparison characteristics 308 of a television content stream can be used to ascertain and identify secondary content contained within the television content stream. For example, consider the situation of a program aired on national broadcast channels such as ABC, NBC, CBS, Fox, and the like. In this instance, there will be multiple copies of the same programs in multiple different markets. For example, a television show such as "Big Bang Theory" may air on CBS, and all of the affiliates of CBS air the same program content. However, a large portion of the ad slots will have different ads. In this instance, the television content streams can be analyzed as by applying an "AND" operation on the content of the different streams. This operation will identify common portions of the television content stream, i.e., the primary content, and the portions of the television content streams that are not common. Those portions that are not common should correspond to secondary content that can then be removed.

In this instance, comparison rules 358 can be used to define how the different television content streams are to be compared to develop the comparison characteristics 308. The comparison characteristics thus describe how one television content stream compares with another such as to identify common portions of the television content stream and portions of the television content stream that are not common portions.

Combining Rules from the Rule Set

In some implementations, rules from the rule set module 204 can be combined and applied to a television content stream. For example, in some instances, audio rules 350 and video rules 352 can be applied to a particular television content stream. That is, audio rules 350 may look for both amplitude variations and encoding resolutions in the audio characteristics of the television content stream, while the video rules 352 may look for black screen occurrences within the video characteristics.

As another example, the audio rules 350, video rules 352, and audio and video rules 354 can be combined and applied to a particular television content stream. That is, audio rules 350 may look for both amplitude variations and encoding resolutions in the audio characteristics of the television content stream, while the video rules 352 may look for black screen occurrences within the video characteristics. At the same time, the audio and video rules 354 may employ the fingerprint matching approach by comparing fingerprints of the television content stream across different locales.

As another example, consider the following. When a program starts, often times a TV rating such as "TV-MA" will be displayed for a few seconds, e.g., five seconds. This will be followed by a few blank frames and perhaps an audio gap exactly like a commercial. However, the TV rating is part of the primary content and should not be removed. In this case, considering simply the audio gap and the video gap may not be enough to prevent removal of the TV rating. Accordingly, the duration of display of the TV rating can be considered as well. By virtue of the fact that there are no five second commercials, the TV rating would not be removed.

By combining different rules from the rule set module 204, primary content can be reliably and efficiently isolated from the television content stream. Doing so will dramatically increase and enhance the user experience.

Having considered how rules from rule set module 204 can be combined to provide a robust and highly scalable automated system, consider now how secondary content that has been removed can be replaced with different secondary content.

Secondary Content Replacement

In some instances, once the secondary content in a television content stream has been removed, other different secondary content can be inserted. For example, once ads in a television content stream have been removed, other different ads can be inserted. The other different ads can be the same duration as the removed ads or, alternatively, can be a different duration. Furthermore, secondary content replacement, such as ad replacement, allows for a more targeted approach which, in some instances, can be on a user-by-user basis. For example, some service providers may maintain advertising profiles for every user. The advertising profiles can be built by monitoring which ads have been the subject of a user interaction and how the user interacted with an ad. For example, Dan may have clicked ads pertaining to Jeep off-road vehicles, Scotch, and the Green Bay Packers. A television content stream can be processed to remove its current ads as described above. The removed ads can then be replaced with ads pertaining to Jeep off-road vehicles, Scotch, and the Green Bay Packers specifically tailored to television content streams that have been identified as intended for Dan's viewing.

Having considered the various implementations described above, consider now an example procedure in accordance with one or more implementations.

Example Procedure

Figure 4:
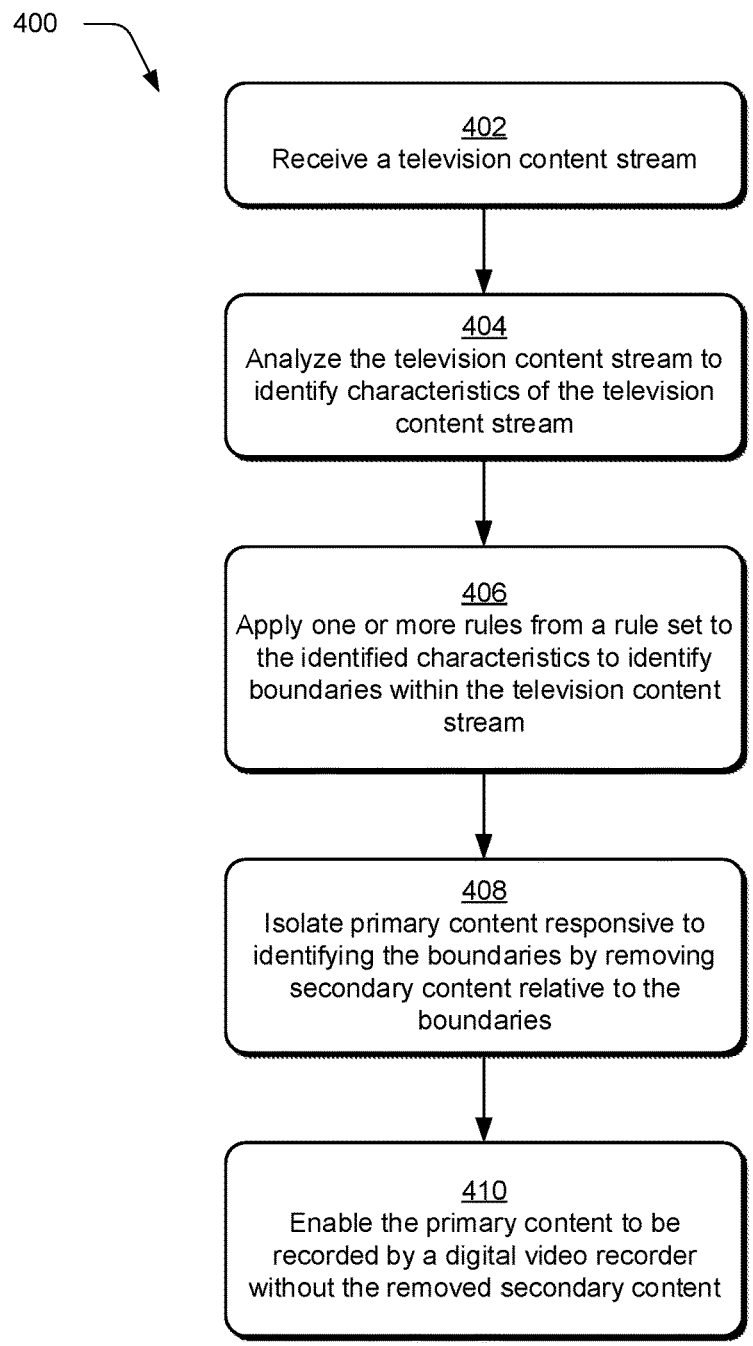
FIG. 4 is a flow diagram that describes operations in accordance with one or more implementations.

FIG. 4 describes an example procedure 400 for automatically isolating primary content from a television content stream in accordance with one or more implementations. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in an environment by a suitably configured device that employs a primary content isolator module, such as that described above.

A television content stream is received at block 402. The television content stream can be received by a primary content isolator or a component of the primary content isolator such as signal isolator 202 (FIG. 2). The television content stream is analyzed, at block 404, to identify characteristics of the television content stream. This operation can be performed by signal isolator 202. As noted above, the television content stream can be analyzed for various characteristics including audio characteristics, video characteristics, audio and video characteristics, video stream characteristics, and comparison characteristics, to name just a few. One or more rules from a rule set are applied, at block 406, to the identified characteristics to identify boundaries within the television content stream. This operation can be performed by a compare module, such as compare module 206 (FIG. 2). The rule set may contain different multiple rule types, individual rules of which can be applied by themselves or, in combination with a variety of rules from different rule types. The multiple different rule types can include, by way of example and not limitation, rules that pertain to audio characteristics, video characteristics, audio and video characteristics, video stream characteristics, comparison characteristics, and the like. Examples of rule types are provided above.

Responsive to identifying the boundaries, primary content is isolated, at block 408, by removing secondary content, such as one or more ads, relative to the boundaries. For example, boundaries indicating the beginning and end of an ad can be utilized to remove the ad. Alternately or additionally, boundaries indicating primary content can be utilized to remove ads by removing those ads that appear outside of the primary content.

The primary content is enabled to be recorded, at block 410, by a digital video recorder without including the removed secondary content. This operation can be performed in any suitable way. For example, a service provider such as service provider 112 (FIG. 1) can employ the use of an automated primary content isolator module 115 to isolate primary content from a television content stream. The service provider can then transmit the television content stream to an end user's computing device so that a digital video recorder may record the primary content. Transmission can occur, in some instances, while the television content stream is being processed by the service provider to remove secondary content. Alternately or additionally, transmission can occur after all of the secondary content has been removed from the television content stream.

The above-described method constitutes an improvement over current approaches which use a primarily manual approach to remove secondary content such as ads. The automated nature of the described implementations provides a fast, efficient and easily scalable solution. That is, through the use of automated rules of the particular types discussed herein, television content can be more quickly and efficiently provided to end users in a desirable format. For example, in scenarios in which live content is processed, the automated process can allow for the corresponding television content stream to be transmitted to an end user's device while the content is still being processed. This would be difficult if not impossible if the operations were to be performed manually because manually removing ads is a slow and arduous process. Moreover, the automated rules promote scalability by removing the need for human intervention, such as adding additional humans to perform the arduous manual process.

Having considered an example procedure in accordance with one or more implementations, consider now example use case scenarios.

Example Use Case Scenarios

The above-described functionality can be implemented in connection with a subscription-based offering that can take different forms. For example, users may pay a flat-fee subscription where all secondary content for designated programs is removed. Alternately or additionally, users may pay a fee for each piece of secondary content that is removed in any particular timeframe such as per week or per month. This allows users to set a budget for weekly or monthly secondary content removal. Alternately or additionally, users may pay a fee for secondary content removal during a certain time of day. For example, the users may wish to view programs during prime time without any secondary content. However, programs viewed outside of prime time may not necessarily be that important to the user so that secondary content is not found to be as distracting.

Alternately or additionally, secondary content removal and content isolation can be conducted based on content type. For example, a user may pay a fee for secondary content to be removed from movies, while content other than movies would be allowed to contain secondary content.

Having considered example use case scenarios in accordance with one or more implementations, consider now an example system and device that can be utilized to implement the implementations described above.

Example System and Device

Figure 5:
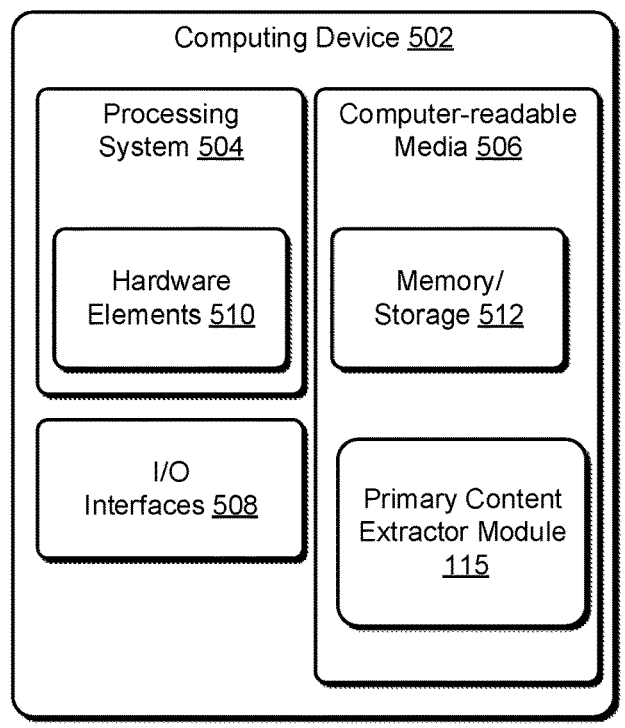
FIG. 5 illustrates an example system including various components of an example device that can be employed in accordance with one or more implementations.

FIG. 5 illustrates an example system generally at 500 that includes an example computing device 502 that is representative of one or more computing systems and/or devices that may implement the various techniques described herein. This is illustrated through inclusion of the primary content isolator module 115, which operates as described above. The computing device 502 may be, for example, a server of a service provider, a device associated with a client (e.g., a client device), an on-chip system, and/or any other suitable computing device or computing system.

The example computing device 502 is illustrated as including a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform as described above.

CONCLUSION

Various implementations process a television content stream to detect program boundaries associated with primary content, such as the starting point and ending point of the program. In at least some implementations, program boundaries such as intermediate points between the starting point and ending point of the program are also detected. The intermediate points correspond to where a program pauses for secondary content, such as an advertisement or advertisements, and then resumes once the secondary content has run. Once program boundaries are detected, program content is isolated by removing secondary content such as advertisements—hereinafter, "ads", as well as other secondary content—that occur before the starting point and after the ending point. In at least some implementations, secondary content such as ads that occur between detected intermediate points are also removed. The program content is then recorded without secondary content that originally comprised part of the original television content stream.

In at least some implementations, a program content isolator module receives a television content stream that includes various secondary content such as ads, and analyzes the television content stream to identify various characteristics of the television content stream. Once the characteristics of the television content stream are identified, semantics that are associated with ads and/or program content can be applied to the television content stream to identify the program boundaries. Semantics can reside in the form of a rule set having multiple rules that can be applied to the television content stream.

Once the program boundaries are identified, the primary content, i.e., program content, can be isolated by removing secondary content such as ads, outside of the program boundaries. The primary content is then recorded without the secondary content that originally comprised part of the original television content stream.

The program content isolator module can reside as a module that is provided as part of a network-based service, also termed a "cloud service". Alternately or additionally, aspects of the program content isolator module can reside on an end user computing device, such as a smart television having a digital video recorder (DVR).

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for automatically isolating primary content from a television content stream comprising:
    receiving, by a primary content isolator module, a television content stream that includes primary content and secondary content;
    creating, by the primary content isolator module, a fingerprint of the television content stream, the fingerprint comprising a hash of a portion of the television content stream;
    identifying, by the primary content isolator module, a boundary within the television content stream from which secondary content can be ascertained, the identifying comprising:
        receiving another fingerprint of another television content stream that contains similar primary content as the television content stream, the other fingerprint comprising a hash of a portion of the other television content stream;
        comparing the other fingerprint of the other television content stream to the fingerprint of the television content stream to determine dissimilar portions; and
        identifying the boundary based upon the dissimilar portions;
    responsive to identifying the boundary within the television content stream, isolating, by the primary content isolator module, primary content by removing secondary content from the television content stream; and
    outputting the isolated primary content.

2. The method as described in claim 1, further comprising identifying another boundary based upon audio amplitude or encoding resolution variances within the television content stream.

3. The method as described in claim 1, further comprising identifying another boundary based upon video resolution variances within the television content stream.

4. The method as described in claim 1, further comprising identifying another boundary based upon video stream metadata associated with the television content stream.

5. The method as described in claim 1, wherein said outputting the isolated primary content comprises transmitting the isolated primary content from a service provider to an end user's computing device.

6. The method as described in claim 1, wherein said outputting the isolated primary content comprises transmitting at least some isolated primary content from a service provider to an end user's computing device while the television content stream is being processed by the service provider to isolate primary content.

7. The method as described in claim 1, wherein the identifying the boundaries in the television content stream further comprises determining durations of the dissimilar portions.

8. The method as described in claim 1, wherein the other television content stream comes from a locale different than a locale of the television content stream.

9. The method as described in claim 1, wherein the secondary content comprises one or more advertisements.

10. The method as described in claim 2, wherein the other boundary is further identified based on durations of the amplitude or encoding resolution variances in the television content stream.

11. The method as described in claim 3, wherein the other boundary is further identified based on durations of the video resolution variances in the television content stream.

12. One or more computer-readable storage media storing computer-readable instructions which, when executed, perform operations for automatically isolating primary content from a television content stream comprising:
    receiving a television content stream that includes primary content and secondary content;
    creating a fingerprint of the television content stream, the fingerprint comprising a hash of a portion of the television content stream;
    identifying a boundary within the television content stream from which secondary content can be ascertained, the identifying comprising:
        receiving another fingerprint of another television content stream that contains similar primary content as the television content stream, the other fingerprint comprising a hash of a portion of the other television content stream;
        comparing the other fingerprint of the other television content stream to the fingerprint of the television content stream to determine dissimilar portions; and
        identifying the boundary based upon the dissimilar portions;
    responsive to identifying the boundary within the television content stream, isolating primary content by removing secondary content from the television content stream; and
    outputting the isolated primary content.

13. The one or more computer-readable storage media of claim 12, wherein the operations further comprise replacing secondary content that was removed from the television content stream.

14. The one or more computer-readable storage media of claim 12, wherein said outputting comprises transmitting at least some isolated primary content from a service provider to an end user's computing device while the television content stream is being processed by the service provider to isolate primary content.

15. The one or more computer-readable storage media of claim 12, wherein the other television content stream comes from a locale different than a locale of the television content stream.

16. The one or more computer-readable storage media of claim 12, wherein the secondary content comprises one or more advertisements.

17. A system comprising:
    a processing system;
    at least one computer readable media storing instructions, executable via the processing system, to perform operations for automatically isolating primary content from a television content stream comprising:
    receiving a television content stream that includes primary content and secondary content;
    creating a fingerprint of the television content stream, the fingerprint comprising a hash of a portion of the television content stream;
    identifying a boundary within the television content stream from which secondary content can be ascertained, the identifying comprising:
        receiving another fingerprint of another television content stream that contains similar primary content as the television content stream, the other fingerprint comprising a hash of a portion of the other television content stream;
        comparing the other fingerprint of the other television content stream to the fingerprint of the television content stream to determine dissimilar portions; and
        identifying the boundary based upon the dissimilar portions;
    responsive to identifying the boundary within the television content stream, isolating primary content by removing secondary content from the television content stream;
    outputting the isolated primary content, wherein said outputting comprises transmitting at least some isolated primary content from a service provider to an end user's computing device while the television content stream is being processed by the service provider to isolate primary content.

18. The system as described in claim 17, wherein the other television content stream comes from a locale different than a locale of the television content stream.

19. The system as described in claim 17, wherein another boundary is identified based upon audio amplitude or encoding resolution variances within the television content stream.

20. The system as described in claim 17, wherein the secondary content comprises one or more advertisements.

\* \* \* \* \*